United States Patent [19]

Asami et al.

[11] Patent Number: 4,841,373

[45] Date of Patent: Jun. 20, 1989

[54] FACSIMILE TRANSMISSION CONTROL METHOD IN WHICH A FRAME OF STORED IMAGE DATA IS TRANSMITTED WHEN EITHER A PREDETERMINED TIME HAS ELAPSED OR A PREDETERMINED AMOUNT OF IMAGE DATA HAS BEEN STORED

[75] Inventors: Kazuo Asami, Yokohama; Fumihiro Ogasawara, Yamato, both of Japan

[73] Assignee: Ricoh Company, Ltd., Tokyo, Japan

[21] Appl. No.: 145,236

[22] Filed: Jan. 19, 1988

[30] Foreign Application Priority Data

Jan. 19, 1987 [JP] Japan .................... 62-8305

[51] Int. Cl.⁴ .................. H04N 1/32; H04N 1/21; H04N 1/40
[52] U.S. Cl. ..................... 358/257; 358/256; 358/280
[58] Field of Search ............. 358/280, 257, 256

[56] References Cited

U.S. PATENT DOCUMENTS 4,549,221 10/1985 Yamamoto .......................... 358/257

FOREIGN PATENT DOCUMENTS 58-94262  6/1983  Japan .................. 358/280
59-89068  5/1984  Japan .................. 358/257
59-205869 11/1984 Japan .................. 358/257
60-38968  2/1985  Japan .................. 358/257
60-136472 7/1985  Japan .................. 358/280
60-236565 11/1985 Japan .................. 358/280
62-209969 9/1987  Japan .

Primary Examiner—James J. Groody
Assistant Examiner—Randall S. Svihla
Attorney, Agent, or Firm—Mason, Fenwick & Lawrence

[57] ABSTRACT

A digital facsimile communication control method includes a step of selectively determining a data communication mode between a digital circuit switching mode and a packet switching mode. When the digital circuit switching mode has been selected, while optically reading an original to be transmitted, the amount of data stored for transmission is checked and also the time is checked. And, if the amount of data stored for transmission has reached a predetermined amount before the time has reached a predetermined time, the amount of data stored for transmission is formed into a frame of data, which is then transmitted. On the other hand, if the time has reached the predetermined time before the amount of data stored for transmission has reached the predetermined amount, an amount of data which has so far been stored is formed into a frame of data, which is then transmitted.

5 Claims, 2 Drawing Sheets

FACSIMILE TRANSMISSION CONTROL METHOD IN WHICH A FRAME OF STORED IMAGE DATA IS TRANSMITTED WHEN EITHER A PREDETERMINED TIME HAS ELAPSED OR A PREDETERMINED AMOUNT OF IMAGE DATA HAS BEEN STORED

BACKGROUND OF THE INVENTION

1. Field of the Invention

This invention generally relates to a digital communication control method, and, in particular, to a digital communication control method and system suitable for use with a digital facsimile machine.

2. Description of the Prior Art

Digital facsimile machines using a digital network as a transmission line are now in practical use. Such digital facsimile machines include those which may selectively use either digital circuit switching or packet switching networks as a transmission line. In digital facsmilie machines, data are typically transmitted as arranged in the form of a frame in accordance with a High-level Data Link Control (HDLC) procedure. The maximum size of data (user data) in such a frame is, typically, set by negotiation with a packet switching network to be connected in the case of using a packet switching network, and, alternatively, in accordance with data transmitting capabilities of both of a transmitter and a receiver in the case of using a digital circuit switching network. In addition, in order to obtain increased transmission efficiency, a predetermined coding process is customarily applied to data to be transmitted.

Typically, transmission of image information of one page in a digital facsimile machine is carried out according to the following procedure. After establishing a transmission line with a receiver, a transmitter determines a transmission function to be used and initiates reading of an original to be transmitted. When the amount of data thus read has reached a predetermined size, the data thus read is formed into a frame, which is then transmitted to the receiver. Upon completion of transmission of data of one page in this manner, the receiver responds by sending a predetermined signal to the transmitter.

Considering the cost of communication, the charge is calculated on the basis of the number of packets transmitted in the case of the packet switching network; whereas, the charge is calculated on the basis of the length of time during which a transmission line has been established in the digital circuit switching network. Thus, in the case of using a packet switching network, the cost of communication can be minimized if data is transmitted while maximizing the size of a frame to be used so as to minimize the number of packets. However, in the case of using a digital circuit switching network, if data is transmitted using a frame having a size which has been set, the cost of communication could increase undesirably under the following situation. That is, if an original has a portion which produces a number of all white lines, the amount of data to be transmitted for one page could become extremely small when compressed by coding. In such a case, the amount of data for one page may be less than the amount of data which can be transmitted by one frame. Even in such a case, a sequence of steps, including: reading of an original (by transmitter), compression by coding process (by transmitter), data transmission (by transmitter and receiver), decompression by decoding process (by receiver) and recording of received image information (by receiver) is carried out in sequence.

On the other hand, since the transmitter cannot disconnect the transmission line until it has received a response from the receiver, a sum of the processing time by the transmitter and the processing time by the receiver is reflected in the time period for keeping the transmission line open. For this reason, the communication time period tends to be longer, and, thus, the cost of communication tends to be higher.

SUMMARY OF THE INVENTION

In accordance with the principle of the present invention, there is provided a communication control method suitable for use in a digital communication system, wherein, when operating in a circuit switching mode, if a predetermined time period has been reached from a starting point of generation of data to be transmitted before a previously set data frame size has been reached, one data frame is formed by the data which has been obtained thus far. In this manner, in accordance with the principle purpose of the present invention, when data is transmitted in a circuit switching mode, the size or length of a data frame is adjustably determined in accordance with the nature of data to be transmitted to thereby minimize the time period during which a transmission line is established in the digital communication network.

It is therefore a primary objective of the present invention to obviate the disadvantages of the prior art and to provide an improved digital communication method and system.

Another object of the present invention is to provide an improved digital communication control method and system capable of transmitting data in a circuit switching mode efficiently.

A further object of the present invention is to provide an improved digital communication control method and system for use with a digital facsimile machine capable of keeping the cost of communication at a low level even if the amount of data to be transmitted for one page is extremely small.

A still further object of the present invention is to provide an improved communication control method and system which is particularly suitable for use with a digital facsimile machine for transmission of data at high speed while minimizing the cost of communication at all times.

Other objects, advantages and novel features of the present invention will become apparent from the following detailed description of the invention when considered in conjunction with the accompanying drawings.

DESCRIPTION OF THE PREFERRED EMBODIMENTS

Figure 1:
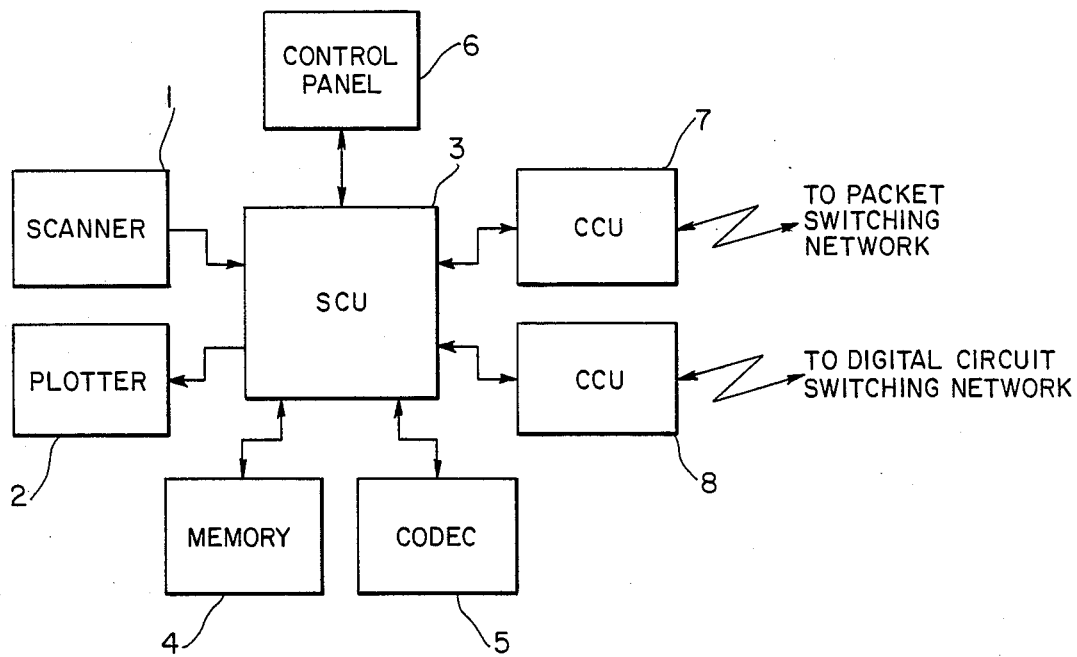
FIG. 1 is a block diagram showing a digital facsimile machine constructed in accordance with one embodiment of the present invention.

Referring now to FIG. 1, there is shown in block form a digital facsimile machine constructed in accordance with one embodiment of the present invention. As shown, the illustrated digital facsimile machine includes a scanner 1 for optically reading an original to be transmitted at a predetermined resolution and a plotter 2 for recording received image information on a recording medium at a predetermined resolution. The facsimile machine also includes a system control unit or SCU 3 in charge of control of the overall operation thereof. Also provided are a memory 4 for storing various information and a codec 5 for compressing the image data which has been obtained from the scanner 1 by coding and decompressing the received image data from the transmitter to the corresponding original image data by decoding.

A control panel 6 is also provided for allowing an operator to give various operational instructions to the digital facsimile machine. For example, the control panel is provided with various keys, switches, indicators and display units, so that the operator can implement an abbrivated dialing function with a fewer number of steps of key inputting operations. A first communication control unit or simply 1st CCU 7 is also provided and it carries out a data transmission control operation when data is to be transmitted through a packet switching network; on the other hand, also provided is a second communication control unit or simply 2nd CCU 8 for carrying out a data transmission control operation using a digital circuit switching network.

Figure 2:
FIG. 2 is an illustration showing the arrangement of various data in an abbreviated dial information table which can be advantageously used in the structure shown in FIG. 1.

It is to be noted that in the memory 4 is stored an abbreviated dial information table DC which includes various abbreviated dial information and corresponding address information in the form of a predetermined table as shown in FIG. 2 so as to provide an abbreviated dialing function. A set of data to be stored in the abbreviated dial information table DC includes an abbreviated dial number, address information of an address to which the abbreviated dial number is allotted and identification information which indicates the identity of a transmission line to be used when data is to be transmitted to that address. Incidentally, the data to be stored in the abbreviated dial information table DC may be input by the operator by operating the control panel 6.

In operation, when image information is to be transmitted using a digital facsimile machine having a structure as described above, with an original to be transmitted being set in position in the scanner 1, the operator inputs an abbreviated dial number of a destination through the control panel 6 to give a command for initiation of transmission. Thus, under the control of SCU 3, the address information and identification information allotted to the abbreviated dial number corresponding to the abbreviated dial number, which has just been input, is input by referring to the abbreviated dial information table DC stored in the memory 4, whereby it is determined whether to use a packet switching network or a digital circuit switching network depending on the contents of the identification information. In the case where use is made of a packet switching network, the SCU 3 activates the first communication control unit 7 by apprising the address information to thereby initiate transmission of data using a packet switching network. Then, after establishing a transmission line with a destination or receiver, and a condition capable of transmitting image information has been established by setting a terminal function, such as image resolution or the like, to be used by carrying out a predetermined pre-transmission control procedure, the system control unit 3 activates the scanner 1 to thereby cause image information of the original which has been set to be input. Thus, a resulting image signal is coded by the codec 5 and then the coded image data is formed into a frame within a scope not to exceed a frame size which has been previously set as a result of negotiation between the transmitter and the packet switching network. Then a frame of image data thus formed is transmitted to the destination through the packet switching network.

On the other hand, when using a digital circuit switching network, while apprising the address information, the system control unit 3 activates the communication control unit 8 to thereby initiate transmission of data using a digital circuit switching network. And, when a transmission line to the destination has been established, in the first place, prior to transmission of image information, predetermined communication control information is exchanged with the destination to thereby set various conditions, such as the maximum size of a frame to be used and other necessary communication functions and terminal functions, including image resolution. Then, the scanner 1 is activated to optically read the original which has been set in position, and, at the same time, a process shown in FIG. 3 is carried out to thereby set the size of a frame to be used for transmitting data.

Figure 3:
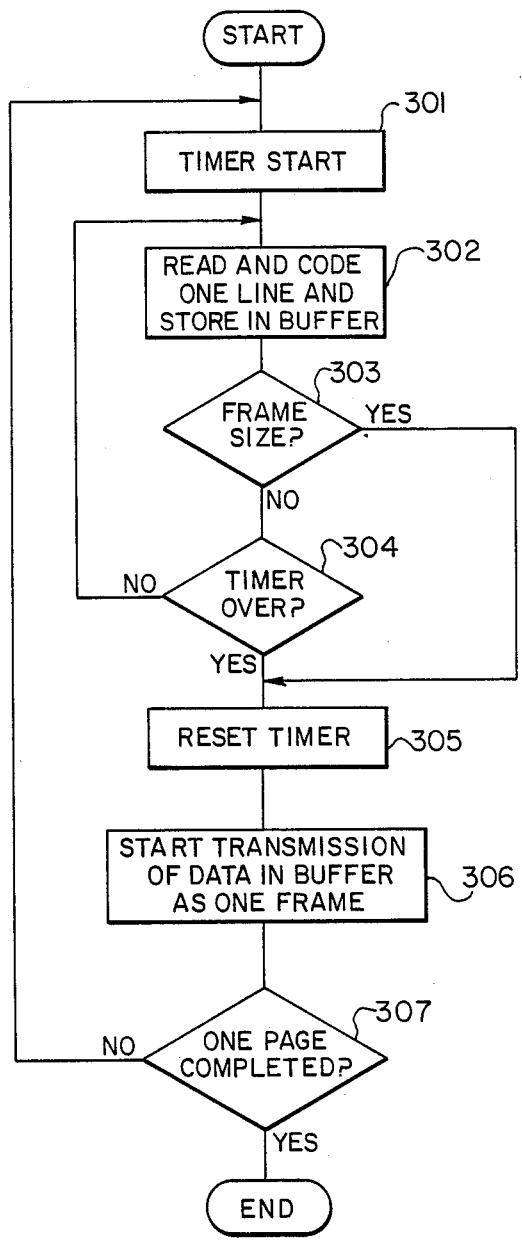
FIG. 3 is a flow chart showing a sequence of steps of a selective frame size determining process which is constructed in accordance with one embodiment of the present invention and which may be advantageously applied to the structure shown in FIG. 1.

As shown in FIG. 3, a timer in which a predetermined monitoring time period has been set is started (step 301), thereby causing one line of image data to be input from the scanner 1. The one line of image data is transferred to the codec 5 for coding (step 302). The thus coded data is then stored in a buffer (not shown), and, then, it is checked to determine whether or not the amount of data thus stored has reached a value that corresponds to the maximum value of a frame size which has been set (step 303). If the result at step 303 is negative, a check is made to see whether or not the timer is in a time-over condition (step 304). If the result at step 304 is negative, step 302 is repeated. In this way, the reading operation is carried out continuously until the result at step 303 is YES as a result of the amount of data stored in the buffer, or, alternatively, the result at step 304 is YES as a result of the time-over condition having been established in the timer.

Then, if the result at either step 303 or 304 is YES, the timer is reset (step 305) and a process for transmitting the data which is stored in the buffer under the conditions as one frame of data is initiated (step 306). Then, a check is made to see whether or not the reading operation for one page has been completed (step 307). If the result at step 307 is negative, step 301 is repeated, and the above-described process is repeated. It is to be noted that the above-described process is carried out in parallel with a data transmission process. The time period set in the timer for the above-described process may be any predetermined time period, or, alternatively, the time period which has been expended for transmission of one frame of data in the immediately preceding cycle. Accordingly, if the amount of data of image information after coding is relatively large, the data to be transmitted is segmented according to the amount of data of a set size frame, whereby each of the thus segmented data is formed as a frame which is then transmitted.

On the other hand, if the amount of data of image information after coding is relatively small, the result at step 304 becomes affirmative before the result at step 303 becomes affirmative, and the amount of data which has been stored in the buffer up to that point is formed as a frame of data to be transmitted. In this manner, in accordance with the present embodiment, when transmitting image information whose amount of data for one page after coding is less than the set frame size, the amount of data that has been produced during a predetermined time period is formed into one frame of data which is then transmitted. As a result, such steps as reading of an original image and compression of image data by coding for one frame of data at the transmitter and such steps as decompression of image data by decoding and recording of image data for the last preceding frame of data at the receiver can be carried out at the same time or in a parallel processing mode. In other words, there can be a time period during which a process at the transmitter and a process at the receiver are carried out at the same time. As a result, in accordance with the present invention, the time period for keeping a transmission path between the transmitter and the receiver in a digital communication path can be reduced as compared with the prior art method in which the process at the transmitter and the process at the receiver are carried out in a sequential mode. Because of this, in accordance with the present invention, the cost of communication using a digital circuit switching mode can be reduced significantly.

As described above, in accordance with the principle of the present invention, if a predetermined time period has elapsed from the time of starting to produce data to be transmitted before the amount of data to be transmitted reaches a data frame size which has been previously set during a transmission control procedure, the data to be transmitted, which has so far been obtained, is used to form one frame of data to be transmitted. Thus, the cost of communication can be maintained at a low level even if the amount of data to be transmitted for one page has become extremely small. It is to be noted that, in the above-described embodiments, use has been made of an abbreviated dial function for placing a call to the destination; however, the present invention is equally applicable to the case in which address information is input with the operator selecting a switching network to be used.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A facsimile transmission control method, comprising the steps of:
   establishing a transmission line between a transmitter and a receiver;
   implementing a predetermined transmission control procedure between said transmitter and said receiver to thereby establish parameters necessary for transmission of data between said transmitter and said receiver; and
   reading an original to produce image data and storing said image data for transmission while at the same time monitoring the amount of image data stored for transmission and also monitoring a timer, wherein, if said amount of image data stored for transmission has reached a predetermined amount before said timer has reached a predetermined time, said amount of image data stored for transmission is formed into a frame of data, which is then transmitted from said transmitter to said receiver, whereas, if said timer has reached said predetermined time before said amount of image data stored for transmission has reached said predetermined amount, then said amount of image data stored for transmission is formed into a frame of data, which is then transmitted from said transmitter to said receiver.

2. The method of claim 1 further comprising a step for selecting one of a digital circuit switching data transmission mode and a packet switching data transmission mode.

3. The method of claim 1, wherein said method is for use in a digital facsimile machine.

4. The method of claim 1, wherein said predetermined time may be any predetermined time.

5. The method of claim 1, wherein said predetermined time may be set to be substantially equal to a time during which image data was stored before it was formed into a frame of data which was transmitted from said transmitter to said receiver during an immediately preceding transmission cycle.

* * * * *